United States Patent

Foo et al.

[11] Patent Number: 6,095,554
[45] Date of Patent: Aug. 1, 2000

[54] METHOD AND APPARATUS FOR SENSING SIDE IMPACT CRASH CONDITIONS WITH AN ENHANCED SAFING FUNCTION

[75] Inventors: Chek-Peng (Anson) Foo, Ann Arbor; Kevin Daniel Weiss; Paul Leo Sumner, both of Farmington Hills; Timothy Chester Wright, Ann Arbor, all of Mich.

[73] Assignee: TRW Inc., Lyndhurst, Ohio

[21] Appl. No.: 09/160,999

[22] Filed: Sep. 25, 1998

Related U.S. Application Data

[63] Continuation-in-part of application No. 08/589,846, Jan. 22, 1996, Pat. No. 5,826,902, which is a continuation-in-part of application No. 08/490,715, Jun. 15, 1995, Pat. No. 5,758,899.

[51] Int. Cl.$^7$ .................................................. B60R 21/32
[52] U.S. Cl. ........................................ 280/735; 280/730.2
[58] Field of Search .................................. 280/735, 730.2

[56] References Cited

U.S. PATENT DOCUMENTS

| | | |
|---|---|---|
| 3,720,426 | 3/1973 | Johnston . |
| 3,889,232 | 6/1975 | Bell . |
| 4,958,851 | 9/1990 | Behr et al. . |
| 5,037,129 | 8/1991 | Fritz et al. . |
| 5,172,790 | 12/1992 | Ishikawa et al. ........................ 180/268 |
| 5,208,484 | 5/1993 | Okano et al. ........................... 307/10.1 |
| 5,322,323 | 6/1994 | Ohno et al. . |
| 5,338,062 | 8/1994 | Kiuchi et al. . |
| 5,357,141 | 10/1994 | Nitschke et al. ........................ 307/10.1 |
| 5,392,024 | 2/1995 | Kuchi et al. ............................. 280/735 |
| 5,428,534 | 6/1995 | Wetzel .................................... 280/735 |
| 5,468,013 | 11/1995 | Gille ....................................... 280/735 |
| 5,737,224 | 4/1998 | Jeenicke et al. ................. 364/424.055 |
| 5,740,041 | 4/1998 | Iyoda ................................ 364/424.055 |
| 5,746,444 | 5/1998 | Foo et al. ................................ 280/735 |
| 5,758,899 | 6/1998 | Foo et al. ................................ 280/735 |

FOREIGN PATENT DOCUMENTS

| | | |
|---|---|---|
| 320674 | 1/1991 | Japan . |
| 4176754 | 6/1992 | Japan . |

*Primary Examiner*—Kenneth R. Rice
*Attorney, Agent, or Firm*—Tarolli, Sundheim, Covell, Tummino & Szabo L.L.P.

[57] ABSTRACT

An apparatus for controlling side actuatable restraint (14, 16) includes a side acceleration sensor (22, 34) mounted to a vehicle at a side location and having an axis of sensitivity (24, 36) oriented in a direction substantially perpendicular to a front-to-rear axis (25) of the vehicle. The side sensor provides a discriminating crash signal when a transverse crash acceleration of the vehicle is sensed indicating a deployment crash event. A first central safing acceleration sensor (52) is mounted at a substantially central location of the vehicle (11) and having an axis of sensitivity (58) oriented in a direction substantially perpendicular to the front-to-rear axis (25) of the vehicle. The first safing sensor provides a first safing crash signal when a deployment crash acceleration is sensed in the transverse direction. A second central safing acceleration sensor (50) is mounted at the substantially central location of the vehicle (11) and having an axis of sensitivity (56) oriented in a direction substantially parallel to the front-to-rear axis (25) of the vehicle (11). The second safing sensor provides a second safing crash signal when crash acceleration is sensed in said first direction. An actuatable restraint is actuated when the side crash sensor (22, 34) provides the discriminating crash signal indicating a deployment crash event and when either said first (52) or said second (50) crash sensor provides a safing crash signal indicating a deployment crash event.

5 Claims, 7 Drawing Sheets

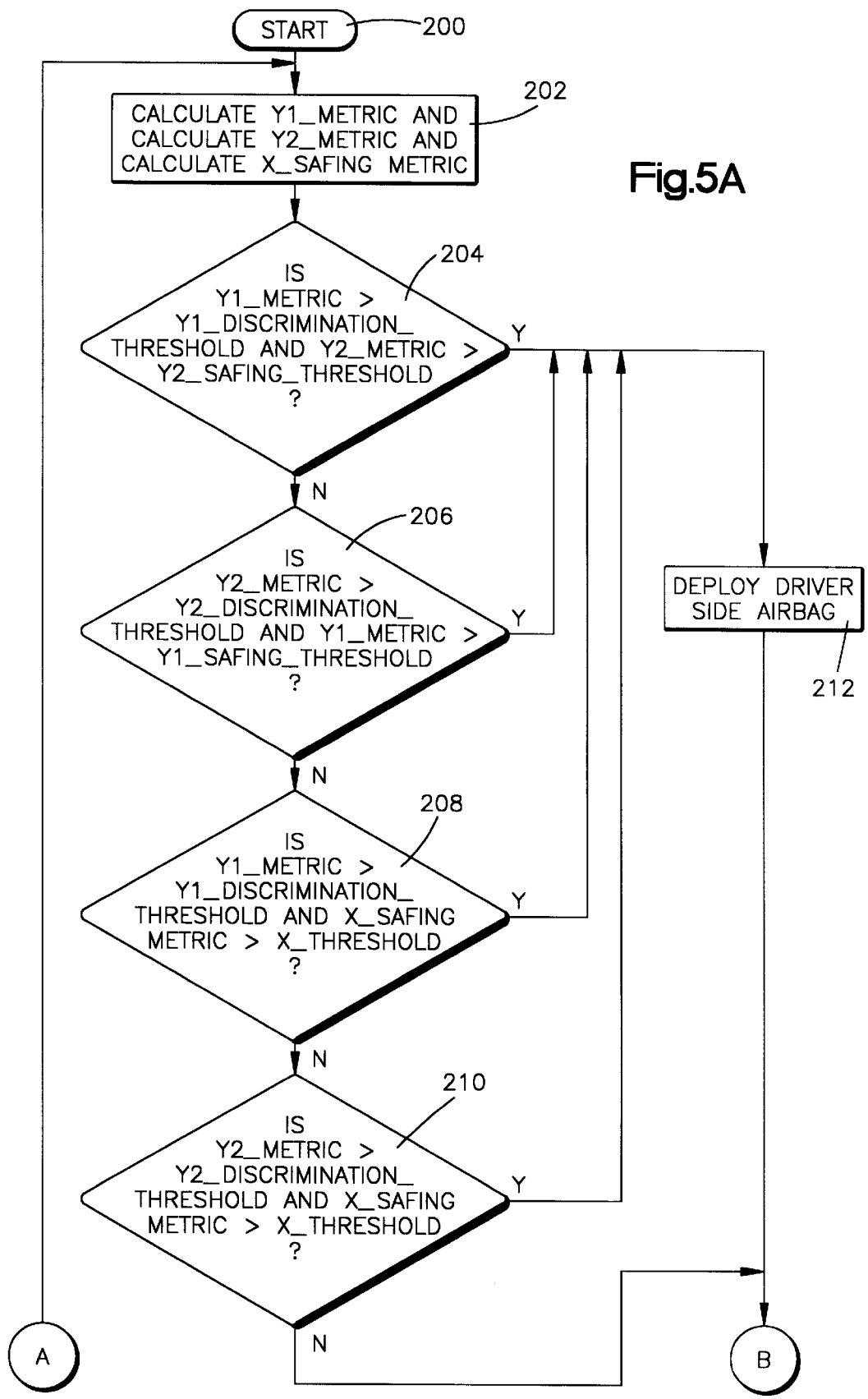

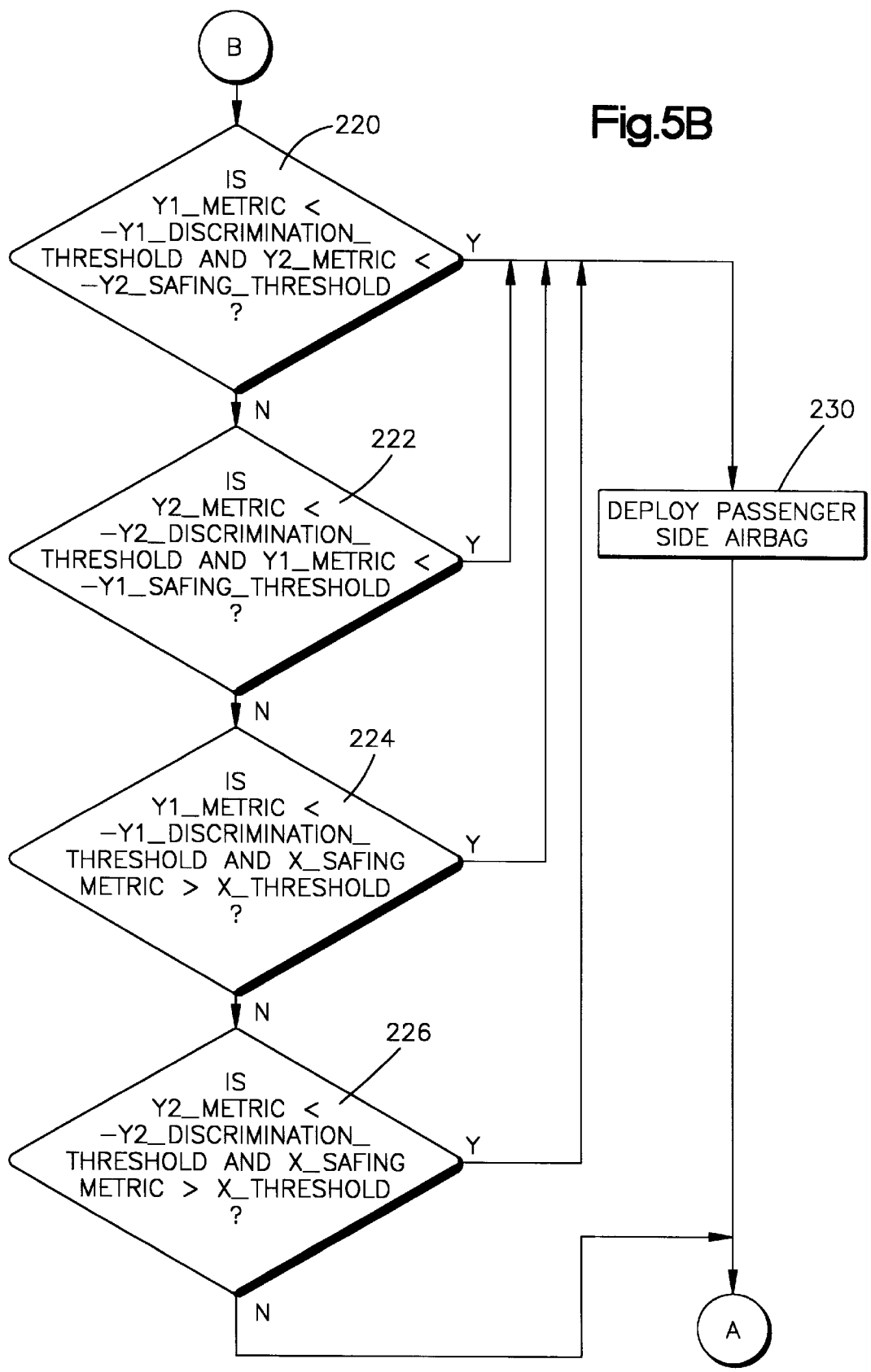

METHOD AND APPARATUS FOR SENSING SIDE IMPACT CRASH CONDITIONS WITH AN ENHANCED SAFING FUNCTION

CROSS-REFERENCE TO RELATED APPLICATIONS

This application is a continuation-in-part of U.S. patent application Ser. No. 08/589,846 to Foo et al., filed Jan. 22, 1996, entitled "METHOD AND APPARATUS FOR SENSING IMPACT CRASH CONDITIONS WITH SAFING FUNCTION" and assigned to TRW Inc., now U.S. Pat. No. 5,826,902, which is a continuation-in-part of U.S. patent application Ser. No. 08/490,715 to Foo et al., filed Jun. 15, 1995, entitled "METHOD AND APPARATUS FOR PROVIDING A SAFING FUNCTION FOR SIDE IMPACT CRASH SENSING SYSTEMS" and assigned to TRW Inc. and which is now U.S. Pat. No. 5,758,899.

TECHNICAL FIELD

The present invention is directed to an occupant restraint system in a vehicle and specifically to a method and apparatus for sensing a side impact crash condition with an enhanced safing function.

BACKGROUND OF THE INVENTION

Systems for restraining vehicle occupants during front and side impacts are known in the art. Each vehicle side seat location having a side restraint includes an associated actuatable side airbag assembly. A controller is connected to the side airbag assembly. The controller controls actuation of the airbag in response to signals provided from crash sensors. Typically, each side airbag assembly has an associated side crash sensor. One known side crash sensor for a side restraint system is a "crush sensor" having a contact switch which closes upon crushing of a vehicle side assembly, e.g., a door, during a side impact crash event. Other side restraint systems use an accelerometer as a crash sensor. One concern regarding use of an accelerometer as a side crash sensor is the ability to discriminate between a side crash event and a door slam event.

Known frontal restraint systems include two crash sensors. One of the crash sensors functions as a "primary" crash sensor and is used for crash discrimination purposes. This primary crash sensor is referred to in the art as a "discrimination" crash sensor. The other crash sensor is a "secondary" crash sensor and is referred to in the art as a "safing" crash sensor. Notwithstanding the names given these crash sensors, actuation of the restraint system requires detection of a deployment crash condition by both the discrimination crash sensor and its associated safing crash sensor.

SUMMARY OF THE INVENTION

The present invention, in accordance with one embodiment, provides a discrimination crash sensor mounted for detection of a side crash event. A front-to-rear facing safing sensor and a sideways facing safing sensor are mounted at or near a central location of the vehicle. Due to the structural design of the vehicle, the front-to-rear facing crash sensor produces a crash signal even when the vehicle experiences a "pure" sideways crash event, i.e., one where the striking object has a force vector into the vehicle side and being substantially perpendicular to the vehicle's front-to-rear axis. Actuation of the side restraint requires detection of a deployment crash event by the discrimination crash sensor and detection of a deployment crash event by one of the centrally mounted safing sensors. To discriminate door slams from actual sideways crash events, a threshold value for the sideways facing safing sensor is set high enough so as to not detect a door slam and a threshold value for the front-to-rear facing safing sensor is set low enough so as to ensure a detection of a sideways crash event. The sideways mounted discrimination sensor can be mounted in the vehicle door, a vehicle side panel, a vehicle cross member, or in the vehicle B pillar. In accordance with another embodiment of the present invention, the discrimination crash sensor is mounted at or near the central location of the vehicle.

In accordance with the invention, an apparatus is provided for controlling an actuatable restraint of a vehicle, comprising a discrimination crash sensor mounted to a vehicle and having an axis of sensitivity oriented in a direction substantially perpendicular to a front-to-rear axis of the vehicle. The discrimination crash sensor provides a discriminating crash signal when a transverse crash acceleration of the vehicle occurs. A first safing sensor is mounted at a substantially central location of the vehicle and has an axis of sensitivity oriented in a direction transverse to the front-to-rear axis of the vehicle. The first safing sensor provides a first safing crash acceleration signal when crash acceleration is sensed in the transverse direction. A second safing sensor is mounted at the substantially central location of the vehicle and has an axis of sensitivity oriented in a direction substantially parallel to the front-to-rear axis of the vehicle. The second centrally located safing acceleration sensor provides a second safing crash acceleration signal when crash acceleration is sensed as a result of a crash in the transverse direction. The apparatus further includes means for actuating the actuatable restraint when the discrimination acceleration sensor provides the discriminating crash signal indicating a sideways deployment crash event and when either the first or the second safing sensors provide their associated safing crash signals indicating a sideways deployment crash event.

In accordance with another aspect of the present invention, a method is provided for controlling actuation of an actuatable side restraint of a vehicle. The method comprises the steps of sensing a crash event along a first direction and providing a discriminating crash signal when a crash event is sensed in the first direction and providing a discriminating crash signal when a deployment crash event is sensed. The method further comprises the steps of sensing along the first direction a first safing crash acceleration and providing a first safing crash signal when a deployment crash event is sensed. Sensing along a second direction substantially perpendicular to the first direction, a second safing crash acceleration and providing a second safing crash signal when a deployment crash event is sensed as a result of the occurrence of a deployment crash event in the first direction. The actuatable side restraint is actuated when the discriminating crash signal indicates a deployment crash event and when either (i) the first safing crash signal indicates a deployment crash event is sensed or (ii) said second safing crash signal indicates a deployment crash event is sensed.

BRIEF DESCRIPTION OF THE DRAWINGS

Further features and advantages of the present invention will become apparent to those skilled in the art to which the present invention relates from reading the following detailed description with reference to the accompanying drawings, in which:

FIGS. 5A and 5B are flow-charts of a control process, in accordance with the present invention, for controlling the restraint system of FIG. 4.

DESCRIPTION OF PREFERRED EMBODIMENTS

Figure 1:
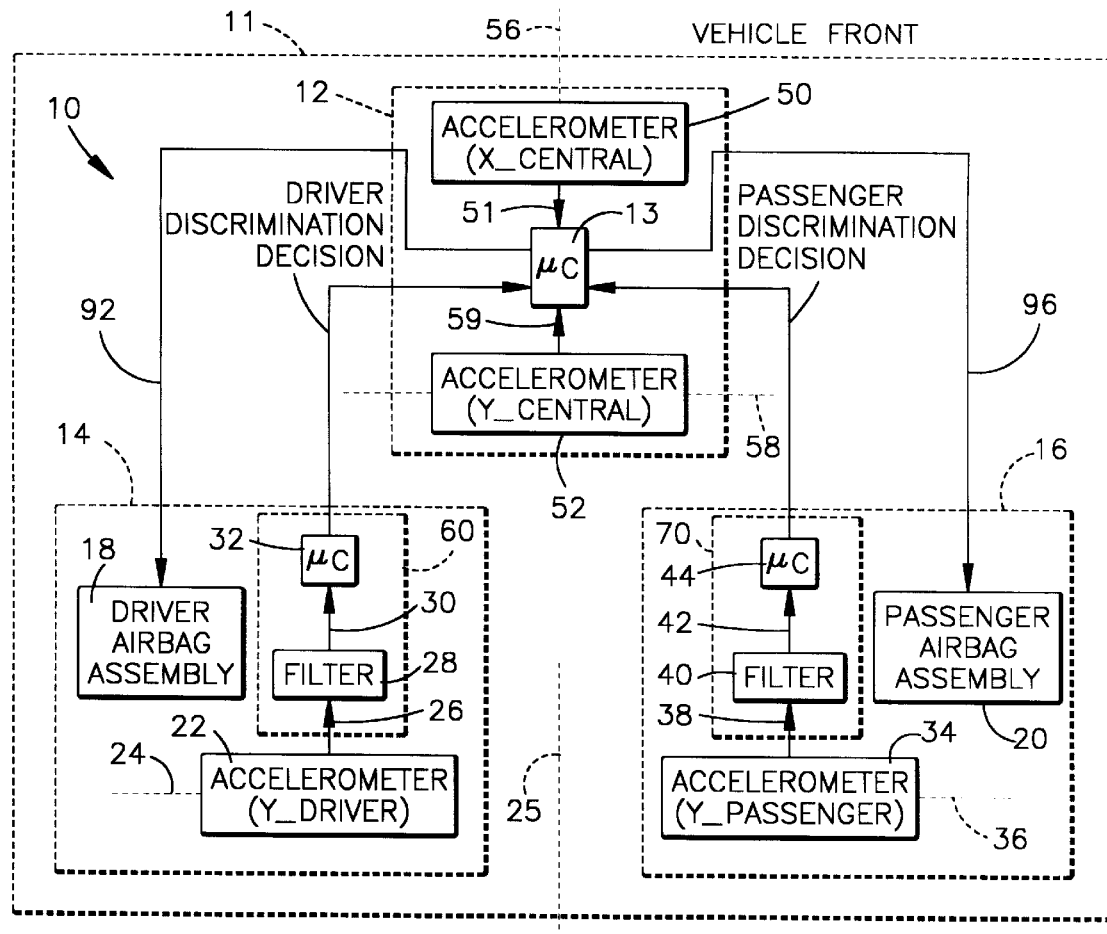
FIG. 1 is a block diagram of a vehicle side impact restraint system in accordance with one embodiment of the present invention.

Referring to FIG. 1, a vehicle side impact restraint system 10, in accordance with one embodiment of the present invention, for use in a vehicle 11 includes a central control module 12. The central control module 12 preferably includes a microcomputer 13 programmed to execute a control process in accordance with the present invention. A driver's side restraint module 14 is connected to the central control module 12. A passenger's side restraint module 16 is also connected to the central control module 12.

The driver's side restraint module 14 includes a driver's side airbag 18 operatively mounted so as to, when inflated, cushion a driver during a sideways deployment crash event. The module 14 further includes an accelerometer 22 mounted so as to have its axis of sensitivity 24 substantially perpendicular to a front-to-rear axis 25 of the vehicle 11. The accelerometer 22 could be secured to the driver's side module assembly 14 itself. Alternatively, the accelerometer 22 could be mounted in the driver's door, a driver's side panel, a B pillar, a driver's side floor cross member, etc. The accelerometer 22 senses transverse vehicle acceleration as occurs during a side crash event into the driver's side of the vehicle. The accelerometer 22 provides a crash acceleration signal 26 indicative of the sensed transverse crash acceleration.

The crash acceleration output signal 26 from the accelerometer 25 is designated Y_DRIVER and has an electrical characteristic functionally related to the sensed transverse crash acceleration, e.g., frequency, amplitude, etc. The acceleration output signal 26 is connected to a filter 28 portion of a signal processor 60. The filter 28 filters the crash acceleration signal 26 and outputs a filtered acceleration signal 30. The filter 28 preferably functions as an anti-alias filter.

A microcomputer 32, which forms part of the signal processor 60, periodically samples the filtered acceleration signal 30 and performs an analog-to-digital ("A/D") conversion on each sampled signal. The A/D conversion of a sampled signal results in digital values representing the analog values of that sampled signal. The sampling rate of the microcomputer 32 is chosen to satisfy known sampling criteria and guarantee that the series of digital values accurately represent the filtered acceleration signal 30. Those skilled in the art should appreciate that the A/D conversion could be accomplished using a separate A/D converter circuit. Preferably, an internal A/D converter of the microcomputer 32 is used.

The microcomputer 32 performs a crash detection algorithm on the converted crash acceleration signal from the accelerometer 22. Any of several known crash metrics could be used to determine a crash value. Preferably, an acceleration based crash metric is used such as a straight (acceleration value, a moving average of acceleration, crash energy (acceleration squared), and/or the absolute value of acceleration. Alternatively or in combination with the acceleration based crash metric, a velocity based crash metric (the integral of acceleration), a displacement based crash metric (the double integral of acceleration), or a jerk based crash metric (the derivative of acceleration) could be used to determine a crash value that is useful in the analysis of the crash event. What ever crash metric (i.e., a crash value) is determined, this value is then, as part of a crash algorithm, compared against a threshold value to determine if a deployment crash event is occurring. A deployment crash event is one in which it has been determined that the airbag should be deployed to aid in cushioning the vehicle occupant.

The threshold value(s) used in this determination can either be fixed or variable as is known in the art. The threshold value(s) are determined using empirical methods based on crash data for a particular vehicle platform of interest. If the microcomputer 32 determines that a crash metric value is greater that its associated threshold value, such occurrence is indicative of a deployment crash event, (at least according to that crash algorithm). If a deployment crash condition is determined to be occurring by the microcomputer 32, a HIGH is output to the central controller 12. The output from the microcomputer 32 is referred to herein as the driver discrimination decision and is a normal digital LOW indicating a non-deployment condition. The output from the microcomputer 32 is connected to an input of microcomputer 13 within the central control module 12.

The passenger's side module 16 is similar to the driver's side module 14. The passenger's side module 16 includes a passenger side airbag assembly 20 mounted so as to aid in cushioning a vehicle passenger during a sideways crash event into the passenger's side of the vehicle. The module 16 further includes an accelerometer 34 which senses crash acceleration along its axis of sensitivity 36 and provides a crash acceleration signal 38 having an electrical characteristic indicative thereof, e.g., frequency, amplitude, etc. This acceleration signal 38 is referred to herein as Y_PASSENGER. The accelerometer 34 is mounted with its axis of sensitivity 36 oriented substantially transverse to the vehicle direction of travel, i.e., substantially transverse to the front-to-rear axis 25 of the vehicle. The accelerometer 34 may be mounted as part of the module assembly itself, or, alternatively in the passenger door, a passenger side panel, the passenger's side B-pillar, or the floor cross member on the passenger's side.

A filter 40 filters the acceleration signal 38 and outputs a filtered acceleration signal 42. The filter 40 forms part of a signal processor 70. The filter 40 functions as an anti-alias filter. A microcomputer 44 periodically samples the filtered acceleration signal 42 and performs a conversion on each sample. The A/D conversion of a sampled signal results in digital values representing the analog acceleration signal. The sampling rate of the microcomputer 44 is chosen to satisfy known sampling criteria and guarantee that the digital crash acceleration values accurately represent the filtered acceleration signal 42.

The microcomputer 44 performs a crash detection algorithm on the digital acceleration signal from the accelerometer 34. As described above with regard to the crash algorithm performed by the microcomputer 32, any of several known crash metrics could be used determined a crash value. What ever crash metric (i.e., crash value) is determined, this value is then compared against a threshold value as part of a crash determining algorithm. As with the microcomputer 32, the threshold value used in the crash algorithm can be either fixed or variable. The threshold value(s) are determined using empirical methods from crash data for a particular vehicle platform of interest.

If the microcomputer 44 determines that a crash metric value is greater that its associated threshold value, such an occurrence is a deployment crash event, i.e., a crash event for which the air bag should be deployed to aid in cushioning the vehicle passenger. If a deployment crash condition is determined to be occurring by the microcomputer 44, a HIGH or TRUE is output to the central controller 12. The output from the microcomputer 44 is referred to herein as the passenger discrimination decision and is a normal digital LOW which is a non-deployment state. The output from the microcomputer 44 is connected to an input of microcomputer 13 within the central control module 12.

The control module 12 has two associated accelerometers 50 and 52, both being electrically connected to the microcomputer 13 of the control module 12. In accordance with a preferred embodiment, both accelerometers 50, 52 associated with the central control module 12 are located at an interior location of the vehicle between the driver's and the passenger's sides of the vehicle at a substantially central location of the vehicle. Preferably, accelerometers 50, 52 are mounted in the transmission tunnel of the vehicle 11. The accelerometers could be mounted at other locations or as part of the central control unit 12 itself.

The front-to-rear facing accelerometer 50 is oriented so that its axis of sensitivity 56 is substantially perpendicular to the axes of sensitivity 24 and 36, of the accelerometers 22, 34, respectively, and substantially parallel to the front-to-rear axis 25 of the vehicle 11. The output 51 of accelerometer 50 is designated as X_CENTRAL and provides to the microcomputer 13 an acceleration signal having an electrical characteristic, e.g., frequency and/or amplitude, indicative of sensed crash acceleration.

The accelerometer 50 is preferably a vibratory accelerometer having an output frequency and amplitude indicative of crash acceleration along the sensor's axis or sensitivity 56. When vehicle 11 is struck in either side (passenger or driver), the accelerometer 50 provides an output signal 51 to microcomputer 13 having useful information regarding the side crash event due to the structural design of the vehicle. This is true even if the crash vector into the side of the vehicle 11 is parallel with the axes 24 or 36 and perpendicular to the axis of sensitivity 56 of the sensor 50.

The accelerometer 52 has an axis of sensitivity 58 oriented substantially perpendicular to the front-to-rear axis 25 of the vehicle 11 and parallel with the axes of sensitivity 24, 36 of accelerometers 22, 34, respectively. The accelerometer 52 provides a crash acceleration signal 59 designed Y_CENTRAL and having an electrical characteristic, e.g., frequency, amplitude, etc., indicative of a sideways crash acceleration resulting from a crash event into either side of the vehicle 11. In accordance with one embodiment of the present invention, the signal 59 is positive for crashes into the driver's side of the vehicle and negative for crashes into the passenger's side of the vehicle. The output 59 of the accelerometer 52 is connected to the central microcomputer 13.

The acceleration signals from the accelerometers 50, 52 are preferably filtered in the same manner as were the signals from the accelerometers 22 and 34. This filtering could be accomplished using discrete circuitry (not shown) or by the central microcomputer 13 itself. Preferably, the outputs of accelerometers 50, 52 are filtered with an anti-alias filter.

The accelerometers 50, 52 are used, in accordance with the present invention, to perform an enhanced safing function for the side restraint system 10. This enhanced safing feature better discriminates between true deployment crash events and door slam events.

To deploy the driver's side airbag 18, the accelerometer 22 with the signal processor circuitry 60 must determine the occurrence of a deployment crash event into the driver's side of the vehicle and either one of the accelerometers 50 or 52 along with the crash algorithm performed by the central microcomputer 13 must also detect a deployment crash event into the driver's side of the vehicle. To deploy the passenger's side air bag 20, the passenger's side accelerometer 34 along with the signal processor circuit 70 must detect a deployment crash event into the passenger's side of the vehicle and either one of the accelerometers 50 or 52 along with the crash algorithm performed by the central microcomputer 13 must also detect a deployment crash event into the passenger's side of the vehicle.

Specifically, in response to the crash acceleration values detected by accelerometers 50, 52, and further in response to the state of the driver discrimination decision and the passenger discrimination decision, the central control module 12 determines whether a driver's side or passenger's side deployment crash event is occurring, i.e., a crash event for which the driver's side airbag 18 or the passenger's side airbag 20 should be deployed. To make this determination, the central microcomputer 13 of the central control module 12 determines crash metric values for the acceleration signals 51 and 59 and then compares each of these crash metric values from the sensors 50, 52 against associated threshold values. The crash metric values can be the same as or different from the ones used with regard to the signal processors 60, 70 discussed above.

The microcontroller 13 monitors if the outputs from the microcomputers 32, 44 are LOW or HIGH. The threshold values used in the comparisons of the output signals 51, 59 are stored in an internal memory of the central microcomputer 13. These stored threshold values are either positive or negative depending on the selected sign nomenclature being used for a selected direction. The nomenclature used herein are selected for purposes of explanation only and are not meant to limit the present invention. According to this nomenclature, crash events into the driver's side of the vehicle results in positive values designated Y_CENTRAL. Crash events into the passenger's side of the vehicle results in negative values designated -Y_CENTRAL. The sign of the acceleration signal from the accelerometer 50 can be both positive or negative for crash events into either side of the vehicle 11.

Figure 2:
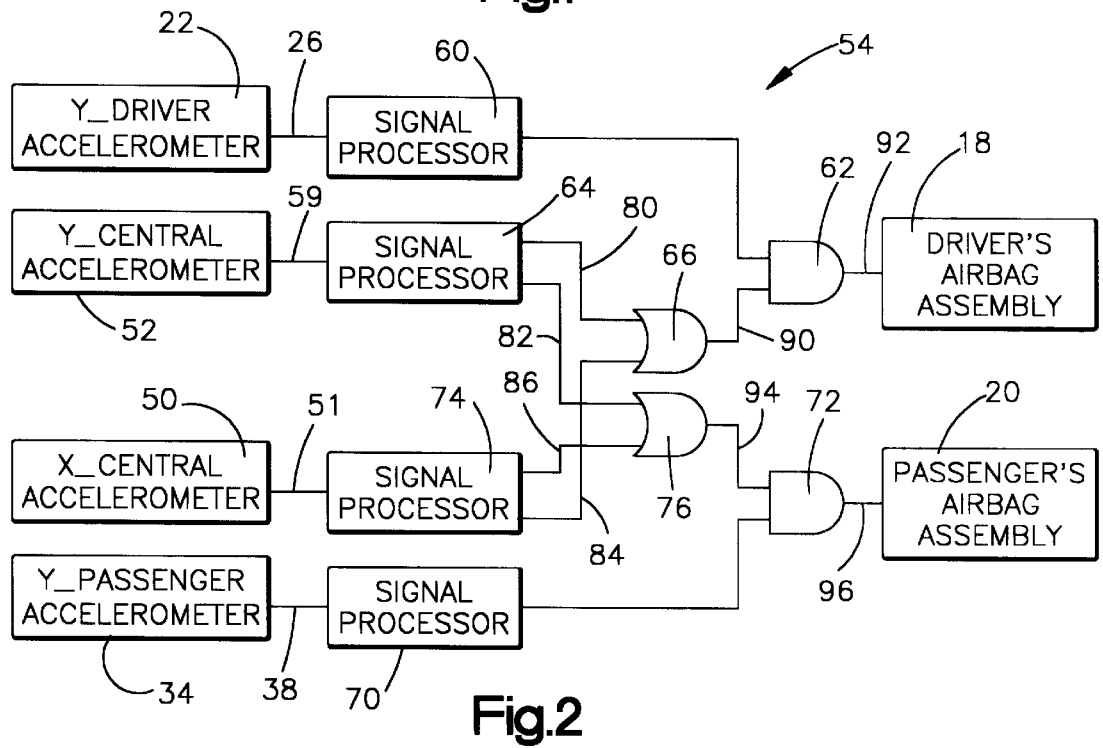
FIG. 2 is a schematic block diagram showing a portion of the fire control logic used in the restraint system of FIG. 1.

Referring to FIG. 2, the fire control logic for the side airbag restraint system shown in FIG. 1 will be better appreciated. The accelerometer 22 outputs a Y_DRIVER accelerometer signal 26 having a value indicative of sensed crash event into the diver's side of the vehicle. This signal 26 is output to the signal processor 60 which is, in turn, connected to a first input of an AND logic function 62. As mentioned, the signal processor 60 performs an acceleration based metric and/or a velocity based metric and determines if a deployment crash event is occurring. If a deployment crash event is occurring, a HIGH or TRUE is output to the control module 12. Acceleration based metrics include a determination of an acceleration value, acceleration squared, the sum of the squares of the acceleration, a moving average of acceleration (e.g., a sum of the lastxnumber of samples), etc. Velocity based metrics include the integral of acceleration, an average velocity, etc. The determined crash metric value (or values) is compared against a threshold value as part of the discrimination crash algorithm to determine if a deployment crash event is occurring. As mentioned, the threshold value can be either fixed or variable depending of the vehicle platform and the desired fire control approach of the vehicle manufacturer. If the determined metric value is greater than firing threshold value, a digital HIGH or TRUE is applied to one input of the ANDing function 62. Otherwise, the output is LOW thereby indicating a non-deployment condition.

The accelerometer 34 outputs a Y_PASSENGER accelerometer signal 38 having a positive value indicative of sensed crash acceleration resulting from a crash event into the passenger's side of the vehicle. This signal 38 is output to the signal processor 70 which is, in turn, connected to a first input of an AND logic function 72. As mentioned, the signal processor 70 can determine any of several known crash metrics to determine a value or values indicative of a crash condition. Preferably, the processor 70 performs an acceleration based metric and a velocity based metric. Acceleration based metrics include a determination of acceleration, acceleration squared, the sum of the squares of the acceleration, a moving average of acceleration (e.g., a sum of the lastxnumber of samples), etc. Velocity based metrics include the integral of acceleration, an average velocity, etc. The determined crash metric value (or values) is compared against a threshold value as part of the discrimination crash algorithm to determine if a deployment crash event is occurring. As mentioned, the threshold value can be either fixed or variable depending of the vehicle platform and the desired fire control approach of the vehicle manufacturer. If the determined metric value is greater than firing threshold value, a digital HIGH or TRUE is applied to the input of the ANDing function 72. Otherwise, the output is LOW thereby indicating a non-deployment condition.

The Y_CENTRAL accelerometer 52 is used to perform a portion of the safing function algorithm for the control of the driver's side airbag assembly 18 and the passenger's side airbag assembly 20. Again, any of several known crash metrics can be used to determine a crash value from the Y_CENTRAL acceleration signal 59 indicative of a crash event into the driver's side of the vehicle or from the −Y_CENTRAL acceleration signal 59 being indicative of a crash event into the passenger's side of the vehicle. As mentioned, the sign is positive for a crash event into the driver's side of the vehicle and negative for a crash events into the passenger's side of the vehicle. The nomenclature used is relative as should be appreciated by one skilled in the art. This metric value for either crash condition (driver's side or passenger's side) is determined using the microcomputer 13 and appropriate filter circuits a further processing.

The portion of the microcomputer 13 that does the filtering and crash algorithm on the Y_CENTRAL signals (both positive and negative) is referred to as the signal processor 64. One skilled the art will appreciated that these functions could be realized using discrete separate circuits instead of all internal to the microcomputer 13.

The crash metric determined from the positive acceleration signal 59 is designated as Y_SAFING METRIC. This value Y_SAFING METRIC is compared against a predetermined threshold designated as Y_THRESHOLD. This is a predetermined value based on crash data for the vehicle platform of interest. If the value Y_SAFING METRIC is negative, it is compared against a threshold value designated −Y_THRESHOLD. The signal processor 64 has two outputs. Output 80 is HIGH when the Y_SAFING METRIC is greater than Y_THRESHOLD. Output 82 is HIGH when the Y_SAFING METRIC is less than −Y_THRESHOLD is indicating a crash into the passenger's side of the vehicle. Output 80 is the result of the positive comparison and is connected to one input of an OR-ing function 66. Output 82 is a result of the negative comparison and is connected to one input of the OR-ing function 76.

The X_CENTRAL accelerometer 50 is used to perform a portion of the safing function for the control both the driver's side airbag assembly 18 and the passenger's side airbag assembly 20. Again, the absolute value (i.e., the magnitude) of any of several known crash metrics can be used to determine a crash value designated X_CENTRAL METRIC for both the driver's side and the passenger's side of the vehicle. This metric value is determined using the microcomputer 13 and appropriate filter circuits and processing functions. The portion of the microcomputer 13 that does the filtering and determination is referred to as the signal processor 74. One skilled the art will appreciated that these functions could be realized using separate circuitry.

The crash metric determined from the acceleration signal 51 is designated as X_CENTRAL METRIC. The signal processor determines if the X_SAFING METRIC is greater than an X_THRESHOLD value independent of crash direction. Two lines are shown as being output from the processor 74 since two different threshold values could be used. Output 84 is connected to one input of the OR-ing function 66. Output 86 is connected to one input of the OR-ing function 76. A HIGH for signal 84 is indicative of a deployment crash event into the driver's side of the vehicle. A HIGH for the signal 86 is indicative of a deployment crash event into the passenger's side of the vehicle.

The output 90 of the OR-ing function 66 is connected to the second input of the ANDing function 62. The output of the ANDing function 62 is controllably connected to the driver's side airbag assembly 18. A HIGH at either input of the OR-ing function 66 and a HIGH from the output of the signal processor 60 results in a HIGH from the ANDing function 62 which, in turn, results in activation and deployment of the driver's side airbag.

The output 94 of the OR-ing function 76 is connected to the second input of the ANDing function 72. The output of the ANDing function 72 is controllably connected to the passenger's side airbag assembly 20. A HIGH at either input of the OR-ing function 76 and a HIGH from the output of the signal processor 70 results in a HIGH from the ANDing function 72 which, in turn, results in activation and deployment of the passenger's side airbag.

Figure 3:
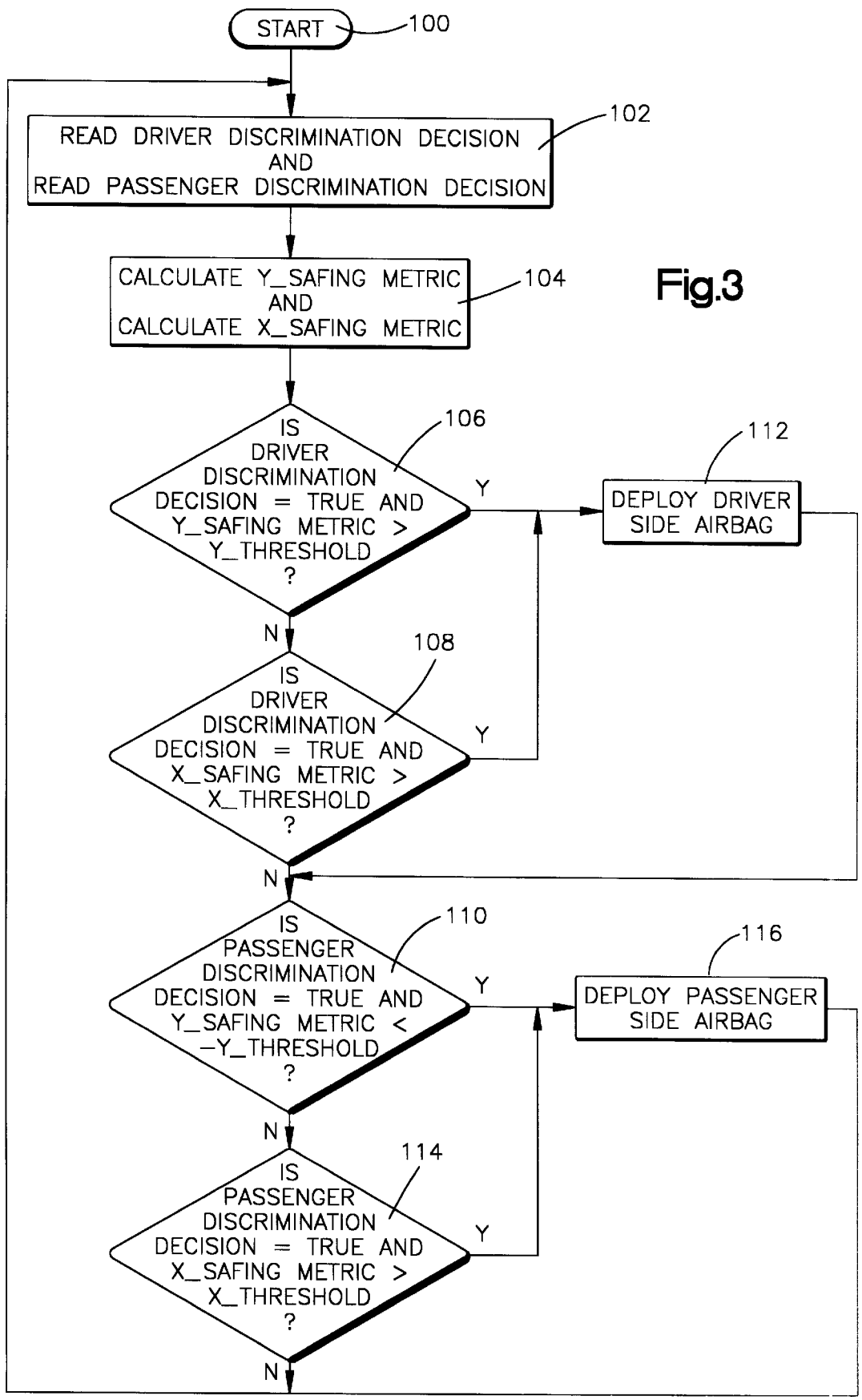
FIG. 3 is a flow-chart of a control process, in accordance with the present invention, for controlling the restraint system of FIG. 1.

Referring to FIG. 3, the control process for the restraint system of FIG. 1 will be better appreciated. In step 100, the process is initialized as would occur during starting of the vehicle 11. During this initialization, memories are cleared, initial flag settings made, etc., for the three microcomputers 13, 32, and 44. In step 102, the driver discrimination decision (output from microcomputer 32) is read and the passenger discrimination decision (output from the microcomputer 44) is read. The process proceeds to step 104 where the Y_SAFING METRIC and the X_SAFING METRIC are calculated from the output signals 59, 51, respectively. In step 106, a determination is made as to whether the driver discrimination decision from microcomputer 32 is TRUE or HIGH and whether the determined Y_SAFING METRIC is greater than a predetermined Y_THRESHOLD value for that vehicle platform. This ANDing function is depicted as the ANDing function 62 of FIG. 2, with the Y_SAFING METRIC determination passing through the OR-ing gate 66.

If the determination in step 106 is negative, a determination is made in step 108 as to whether the driver discrimination decision (output of microcomputer 32) is TRUE or HIGH and whether the X_SAFING METRIC value is greater than a preselected X_THRESHOLD value. This ANDing function is depicted as ANDing gate 62 in FIG. 2, with the X_SAFING METRIC determination being passed through the OR-ing gate 66. If a negative determination occurs in step 108, the process proceeds to step 110.

From steps 106 and 108, it can be seen that a driver discrimination decision being TRUE or HIGH AND the Y_SAFING METRIC being greater than the Y_THRESHOLD OR the X_SAFING METRIC being greater than X_THRESHOLD results in deployment of the driver side airbag in step 112. The combination of steps 106 and 108 with either affirmative determinations going to step 112 has the effect represented by the OR-ing function 66 of FIG. 2. The process then proceeds to step 110.

In step 110, a determination is made as to whether the passenger discrimination decision from microcomputer 44 is TRUE or HIGH and whether the determined Y_SAFING METRIC value is less than a predetermined −Y_THRESHOLD value for that vehicle platform. This ANDing function is depicted as the ANDing function 72 of FIG. 2, with the Y_SAFING METRIC determination passing through the OR-ing gate 76. If the determination in step 110 is negative, a determination is made in step 114 as to whether the passenger discrimination decision (output of microcomputer 44) is TRUE or HIGH and whether the X_SAFING METRIC value is greater than a preselected X_THRESHOLD value. The X_THRESHOLD value in steps 108 and 114 could be the same or different. Again, this ANDing function is depicted as ANDing gate 72 in FIG. 2, with the X_SAFING determination being passed through the OR-ing gate 76. The effect of steps 110 and 114 with either affirmative determinations going to step 116 has the effect represented by the OR-ing function 76 in FIG. 2. If negative determination occurs in step 114, the process loops back to step 102.

From steps 110 and 114, it can be seen that a passenger discrimination decision being TRUE or HIGH AND the Y_SAFING METRIC being less than the −Y_THRESHOLD OR the X_SAFING METRIC being greater than X_THRESHOLD results in deployment of the passenger side airbag in step 116. The process then loops back to step 102.

The process steps in FIG. 3 are shown for discussion purposes as being in a particular order. The actual order of the steps could be in a different order and could be accomplished in parallel processing.

Figure 4:
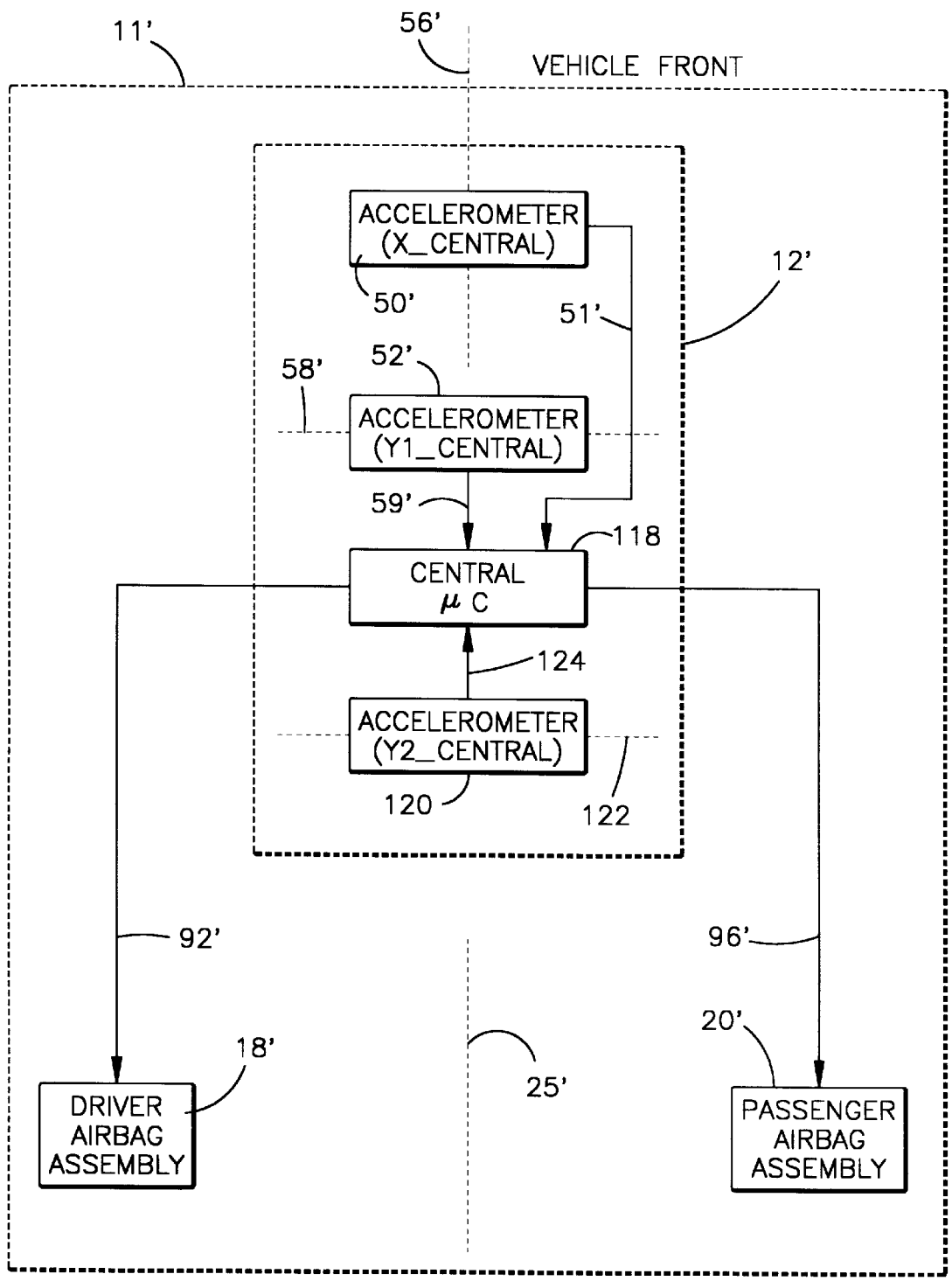
FIG. 4 is a block diagram of a vehicle side impact restraint system in accordance with another embodiment of the present invention.

Referring now to FIG. 4, an alternative embodiment of the present invention will be appreciated. A vehicle 11' includes a driver's side airbag assembly 18' and a passenger's side airbag assembly 20' controllable coupled to a central controller 12'. The side airbag assemblies are mounted in associated sides of the vehicle in a known manner.

The central controller 12' includes a microcomputer 118 that controls actuation of the airbags of assemblies 18', 20' in response to sensor inputs. A first accelerometer 50' has an axis of sensitivity 56' and is mounted to the vehicle 11' so that its axis of sensitivity 56' is substantially parallel to the front-to-rear axis 25' of the vehicle 11'. The output 51', also designated X_CENTRAL, of the accelerometer 50' is connected to the microcomputer 118. The central controller 12' further includes an accelerometer 52' having an axis of sensitivity 58' is mounted to the vehicle at the central location so that its axis of sensitivity is substantially perpendicular to the front-to-rear axis 25' of the vehicle 11'. The output 59', designated Y1_CENTRAL, of the accelerometer 52' is connected to the microcontroller 118. The accelerometer 52' senses accelerations in both direction so as to detect crash events into either the driver's side or into the passenger's side of the vehicle 11'.

The central controller 12' further includes an accelerometer 120 having an axis of sensitivity 122 and mounted to the vehicle at the central location so that its axis of sensitivity is substantially perpendicular to the front-to-rear axis 25' of the vehicle 11'. The output 124, designated Y2_CENTRAL, of the accelerometer 120 is connected to the microcontroller 118. The accelerometer 120 senses accelerations in both directions so as to detect crash events into either the driver's side or the passenger's side of the vehicle.

The central microcomputer 118 monitors all three accelerometers. Accelerometers 52' and 120 are used for both discrimination and safing purposes. Accelerometer 50' is used only for safing.

Referring to FIGS. 5A and 5B, the control process for the embodiment shown in FIG. 4 will be better appreciated. In step 200, the process is initialized as would occur during starting of the vehicle 11'. During this initialization, memories are cleared, initial flag settings made, etc., for the microcomputer 118. In step 202, the crash metric values for the Y1_METRIC, the Y2_METRIC, and the X_SAFING METRIC are calculated. As mentioned, these metric values can be acceleration base (acceleration, a moving average of acceleration, acceleration squared, etc.) or a velocity based metric value. However, only the absolute value (i.e., the magnitude) is used for the X_SAFING METRIC. The process proceeds to step 204 where a determination is made as to whether the determined Y1_METRIC is greater than a predetermined Y1_DISCRIMINATION THRESHOLD value and whether the Y2_METRIC value is greater than a predetermined Y2_SAFING_THRESHOLD value. As described with regard to the first embodiment, the threshold values are empirically determined for a particular vehicle platform based on crash data and analysis so as to achieve a desired restraint control. If the determination in step 204 is negative, the process proceeds to step 206.

In step 206, a determination is made as to whether the determined Y2_METRIC is greater than a predetermined Y2_DISCRIMINATION THRESHOLD value and whether the Y1_METRIC value is greater than a predetermined Y1_SAFING_THRESHOLD value. If the determination is negative, the process proceeds to step 208. In step 208, a determination is made as to whether the determined Y1_METRIC is greater than a predetermined Y1_DISCRIMINATION THRESHOLD value and whether the X_SAFING_METRIC value is greater than a predetermined X_THRESHOLD value. If the determination is negative, the process proceeds to step 210. In step 210, a determination is made as to whether the determined Y2_METRIC is greater than a predetermined Y2_DISCRIMINATION THRESHOLD value and whether the X_SAFING_METRIC value is greater than a predetermined X_THRESHOLD value.

From an affirmative determination from any of steps 204, 206, 208, or 210, the driver's side restraint (i.e., airbag) is actuated in step 212. From either step 212 or a negative determination in step 210, the process proceeds to step 220. In step 220, a determination is made as to whether the determined Y1_METRIC is less than a predetermined -Y1_DISCRIMINATION THRESHOLD value and whether the Y2_METRIC value is less than a predetermined -Y2_SAFING_THRESHOLD value. As described with regard to the first embodiment, the threshold values are empirically determined for a particular vehicle platform based on crash data and analysis so as to achieve a desired restraint control. If the determination in step 220 is negative, the process proceeds to step 222.

In step 222, a determination is made as to whether the determined Y2 METRIC is less than a predetermined -Y2_DISCRIMINATION THRESHOLD value and whether the Y1_METRIC value is less than a predetermined -Y1_SAFING_THRESHOLD value. If the determination is negative, the process proceeds to step 224. In step 224, a determination is made as to whether the determined Y1_METRIC is less than a predetermined -Y1_DISCRIMINATION THRESHOLD value and whether the X_SAFING_METRIC value is greater than a predetermined X_THRESHOLD value. If the determination in step 224 is negative, the process proceeds to step 226. In step 226, a determination is made as to whether the determined Y2_METRIC is less than a predetermined -Y2_DISCRIMINATION THRESHOLD value and whether the X_SAFING_METRIC value is greater than a predetermined X_THRESHOLD value.

From an affirmative determination from any of steps 220, 222, 224, or 226, the passenger's side restraint (i.e., airbag) is actuated in step 230. From either step 230 or a negative determination in step 226, the process loops back to step 202.

The order of the process steps in FIGS. 5A and 5B are given for discussion purposes only. Another order could be used and parallel processing could be used.

Figure 6:
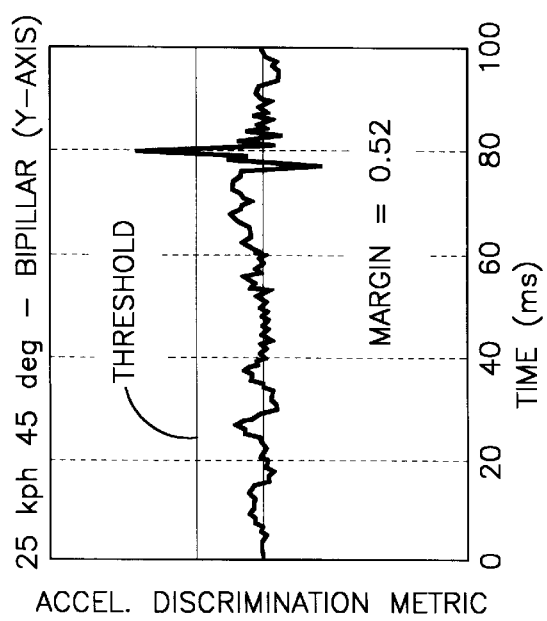
FIG. 6 is a graphical representation of an acceleration based discrimination crash metric over time for a must fire crash condition.

The description of FIGS. 6–11 assume the embodiment of the present invention shown in FIG. 1. Referring to FIG. 6, a value is shown of an acceleration based crash metric over time for a twenty-four kph (kilometers per hour) crash into the side of a vehicle at a 45 degree angle relative to the axis 24 using a crash accelerometer Y_DRIVER located in the B-pillar of the vehicle. This type of crash event is classified as a "must fire" event. This crash metric is the value determined by the microcomputer 32. At slightly less than 80 msec. into the crash event, the crash algorithm determines that the crash metric value exceeds a predetermined threshold value. Under these circumstances, a HIGH signal would be output from the processor circuit 60 to the microcomputer 30. A margin value of 0.52 is assigned to this graph illustration to indicate the robustness of the algorithm. The margin value indicates that the crash metric values could be reduced by 48% and the algorithm (i.e., has the determined crash metric value exceeded the threshold value) will still "catch" the deployment crash condition. For must fire crash events, it is necessary that the margin value be less than one to insure a deployment of the restraint.

Figure 7:
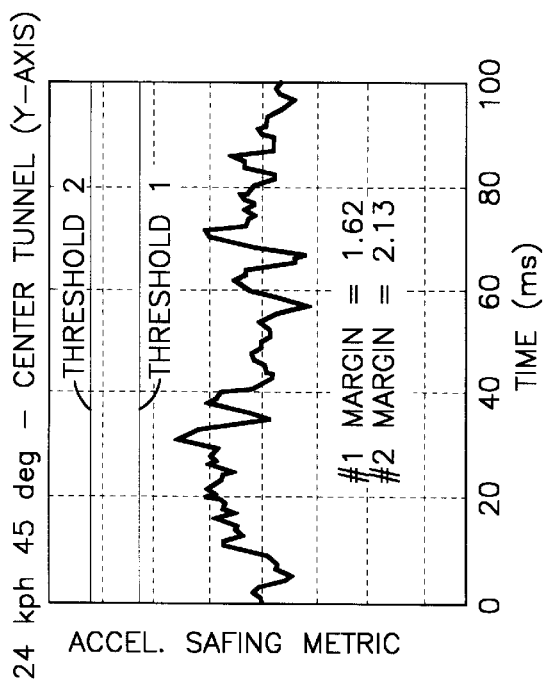
FIG. 7 is a graphical representation of an acceleration based safing metric over time for the same must fire crash event depicted in FIG. 6.

FIG. 7 shows an acceleration based crash metric (Y_CENTRAL) value in response to the acceleration signal from the accelerometer 52. As can be seen from the graph of FIG. 7, the crash metric value never exceeds the threshold value 1. Therefore, the Y_CENTRAL safing function would remain LOW resulting in a no fire event based on that metric. This fact is represented by a margin value of 1.62. The crash metric value would have to be increased by 62% to catch the deployment crash event. As will be appreciated from the discussion below, the threshold value 1 can not be lowered to insure a catch of a this must fire event without risking a deployment determination in response to a door slam event. In fact, according to the present invention, the threshold for the Y_CENTRAL accelerometer is to be raised to a value threshold 2 to prevent a door slam event from triggering a deployment signal. Although this raises the margin to 2.13, in insures that a door slam event will not be interpreted as a must fire event.

Figure 8:
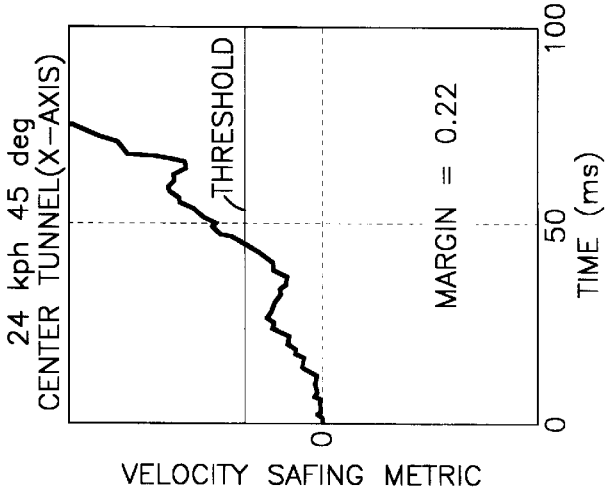
FIG. 8 is a graphical representation of a velocity based safing metric over time for the same must fire crash event depicted in FIG. 6.

FIG. 8 shows the safing crash metric based on the X_CENTRAL accelerometer 50 signal. The crash metric used is a velocity based crash metric determined in response to the accelerometer signal from X_CENTRAL accelerometer 50. As can be seen from the graph, the velocity based crash metric value exceeds its threshold value in less than 50 msec. This will result in deployment of the air bag when both the crash metric in FIG. 6 and that in FIG. 8 exceed their threshold values. The margin for this crash metric depicted in graph of FIG. 8 is 0.22 which is well less than 1 thereby indicating a good robustness. Since the crash algorithm using the metrics shown in FIG. 7 and FIG. 8 are OR-ed together, the resultant margin is the lower of the two, i.e., 0.22. This insures a catch of the must fire events.

Figure 10:
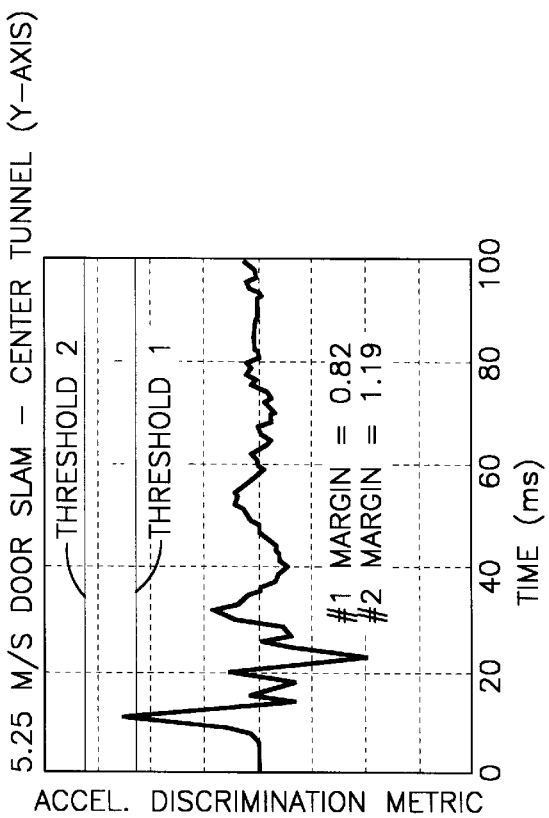
FIG. 10 is a graphical representation of an acceleration based safing metric over time for the no fire door slam event of FIG. 9.
Figure 9:
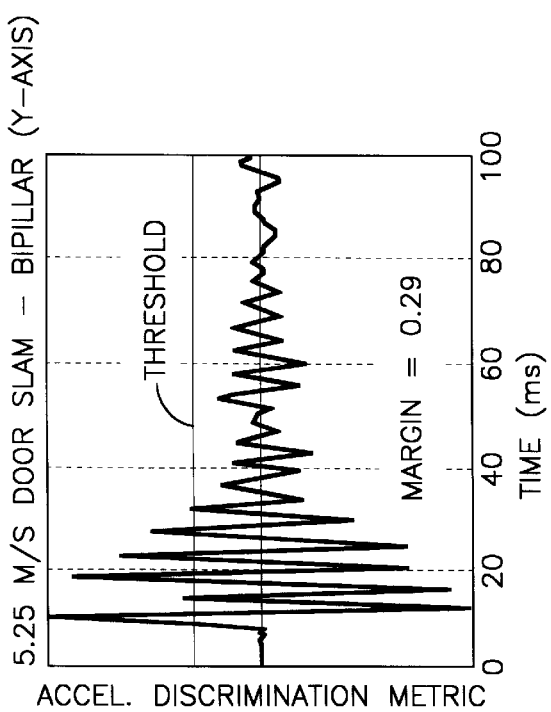
FIG. 9 is a graphical representation of an acceleration based crash metric over time for a no fire door slam event.
Figure 11:
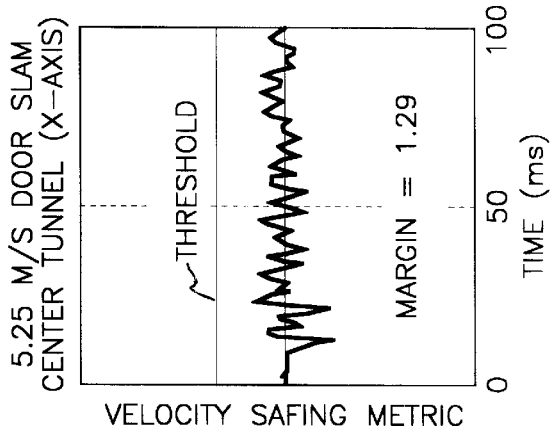
FIG. 11 is a graphical representation of a velocity based safing metric over time for the no fire door slam event of FIG. 9.

FIGS. 9–11 depict a door slam event. FIG. 9 shows the resultant acceleration discrimination metric for a door slam condition in which the vehicle door is slammed closed at a velocity of 5.25 meters per second. This is a no-fire event. The determined metric value is responsive to the signal from Y_DRIVER accelerometer 22 located in the B-pillar of the vehicle. After only about 10 msec., the threshold value is exceeded thereby indicating a deployment crash event. The margin on this algorithm is 0.29. Therefore, a HIGH will be output to the microcomputer 13. FIG. 10 shows the acceleration based crash metric value determined from the Y_CENTRAL signal. From this graph, it can be appreciated that the threshold value must be raised from the threshold 1 value to the threshold 2 value to prevent a deployment signal from being produced for this no-fire crash event. If the threshold were not raised, the air bag would be deployed since both the discrimination algorithm and the safing algorithm would indicate a fire condition. By raising the threshold value, the margin changes from 0.82 to 1.19. This is desirable since a margin greater than one is necessary to prevent deployment.

FIG. 11 depicts the safing function results based on the X_CENTRAL accelerometer signal. A velocity based crash metric never exceeds its threshold 1 level. In this case, since neither the Y_CENTRAL based crash metric nor the X_CENTRAL based crash metric exceed their associated threshold, the air bag is not deployed. The margin of the crash metric value of FIG. 11 is 1.29. Since the Y_CENTRAL based margin is 1.19 and the X_CENTRAL based margin is 1.29, the resultant margin of 1.19 results from the OR-ing function thereby preventing triggering of the air bag.

From the graphs shown in FIGS. 6–11, it can be appreciated that a control arrangement in accordance with the present invention permits catching of a true must fire crash event while preventing a no-fire door slam event from triggering a deployment event.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling an actuatable restraint of a vehicle, comprising:

a discrimination acceleration sensor mounted to the vehicle and having an axis of sensitivity oriented in a direction substantially perpendicular to a front-to-rear axis of the vehicle and providing a discriminating crash signal when a transverse crash acceleration of the vehicle is sensed;

first safing acceleration sensor mounted at a substantially central location of the vehicle and having an axis of sensitivity oriented in a direction substantially perpendicular to the front-to-rear axis of the vehicle and providing a first safing crash signal when crash acceleration is sensed in said transverse direction;

second safing acceleration sensor mounted at the substantially central location of the vehicle and having an axis of sensitivity oriented in a direction substantially parallel to the front-to-rear axis of the vehicle and providing a second safing crash signal when crash acceleration is sensed as a result of a crash in the transverse direction; and means for actuating said actuatable restraint when said discrimination acceleration sensor provides said discriminating crash signal indicating a deployment crash event and when either said first or said second safing acceleration sensors provide their associated safing crash acceleration signal indicating a deployment crash event.

2. The apparatus of claim 1 wherein said discriminating crash sensor is mounted at a side location of the vehicle.

3. The apparatus of claim 1 wherein said discriminating crash sensor is mounted at a substantially central location of the vehicle.

4. The apparatus of claim 1 wherein said means for actuating said actuatable restraint includes means for comparing an acceleration signal from said first safing sensor against a first predetermined value and means for comparing an acceleration signal from said second safing sensor against a second predetermined value wherein said first and second predetermined values are not equal.

5. A method for controlling actuation of an actuatable side restraint of a vehicle, said method comprising the steps of:

sensing a crash acceleration using a discriminating acceleration sensor, said discriminating acceleration sensor providing a deployment crash signal when a crash event is sensed in a first direction having a value greater than a first threshold value;

sensing a first safing crash acceleration using a first safing crash acceleration sensor and providing a first safing crash signal when a deployment crash event is sensed in said first direction;

sensing a second safing crash acceleration using a second safing crash acceleration sensor and providing a second safing crash signal when a deployment crash event is sensed in a second direction substantially perpendicular to said first direction as a result of a crash event in said first direction; and actuating said side actuatable restraint when said discriminating crash signal indicates a deployment crash event and either (i) said first safing crash signal indicates a deployment crash event is occurring or (ii) said second safing crash signal indicates a deployment crash event is occurring.

* * * * *